US012736694B2

(12) United States Patent
Cuny et al.

(10) Patent No.: US 12,736,694 B2
(45) Date of Patent: Sep. 15, 2026

(54) METHOD TO PERFORM SELECTION OF OPTICAL GAUGE LENGTH OF FIBERS USED IN HYDROCARBON RECOVERY OPERATIONS, CARBON CAPTURE AND SEQUESTRATION, AND GEOTHERMAL APPLICATIONS

(71) Applicant: SCHLUMBERGER TECHNOLOGY CORPORATION, Sugar Land, TX (US)

(72) Inventors: Theo Cuny, Clamart (FR); Joel Herve Le Calvez, Sugar Land, TX (US); Pierre Bettinelli, Kuala Lumpur (MY); Nicholas Fundytus, Edmonton (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/101,256

(22) PCT Filed: Aug. 4, 2023

(86) PCT No.: PCT/US2023/029507
§ 371 (c)(1),
(2) Date: Feb. 5, 2025

(87) PCT Pub. No.: WO2024/030623
PCT Pub. Date: Feb. 8, 2024

(65) Prior Publication Data

US 2026/0009913 A1 Jan. 8, 2026

Related U.S. Application Data

(60) Provisional application No. 63/370,573, filed on Aug. 5, 2022.

(51) Int. Cl.
*G01V 1/22* (2006.01)
*G01V 1/50* (2006.01)
(Continued)

(52) U.S. Cl.
CPC ................ *G01V 1/226* (2013.01); *G01V 1/50* (2013.01); *E21B 41/0064* (2013.01); *E21B 43/26* (2013.01); *G01V 2210/622* (2013.01)

(58) Field of Classification Search
CPC .... G01V 1/226; G01V 1/50; G01V 2210/622; E21B 41/0064; E21B 43/26
See application file for complete search history.

(56) References Cited

U.S. PATENT DOCUMENTS 9,880,047 B2 * 1/2018 Martin ..................... G01H 5/00
11,788,387 B2 * 10/2023 Duthie .................. E21B 47/114 166/250.01

(Continued)

FOREIGN PATENT DOCUMENTS

WO 2016112147 A1 7/2016

OTHER PUBLICATIONS

Dean et al., The effect of gauge length on axially incident P=Waves measured using fibre optic distributed vibration sensing, Geophysical Prospecting, 2017, 65, pp. 184-193.

*Primary Examiner* — Elias Desta
(74) *Attorney, Agent, or Firm* — Jeffrey D. Frantz

(57) ABSTRACT

Embodiments presented provide for use of fiber optics within the wellbore environment. Embodiments further provide selection of optimal gauge length of fiber optics in hydrocarbon recovery operations, carbon capture and sequestration operations, or geothermal applications. The method includes obtaining data from optical fibers, processing the data using a fixed gauge length, estimating an apparent velocity using the fixed gauge length through an autonomous computing arrangement, estimating a source bandwidth from the apparent velocity through the autonomous computing arrangement to produce a result, establishing a variable gauge length and reference profile for the
(Continued)

result, and processing the obtained data with the established variable gauge length to yield a processed optical data set.

20 Claims, 2 Drawing Sheets

(51) Int. Cl.
*E21B 41/00* (2006.01)
*E21B 43/26* (2006.01)

(56) References Cited

U.S. PATENT DOCUMENTS

| | | | | |
|---|---|---|---|---|
| 11,802,983 | B2 * | 10/2023 | LeBlanc ................ | G01V 1/226 |
| 2016/0245077 | A1 | 8/2016 | Willis et al. | |
| 2018/0003550 | A1 | 1/2018 | Dean et al. | |
| 2019/0227184 | A1 | 7/2019 | Cuny et al. | |
| 2019/0331819 | A1 | 10/2019 | Wu et al. | |
| 2020/0333487 | A1 | 10/2020 | Padhi et al. | |

* cited by examiner

METHOD TO PERFORM SELECTION OF OPTICAL GAUGE LENGTH OF FIBERS USED IN HYDROCARBON RECOVERY OPERATIONS, CARBON CAPTURE AND SEQUESTRATION, AND GEOTHERMAL APPLICATIONS

CROSS-REFERENCE TO RELATED APPLICATIONS

The present patent application is a National Stage Entry of International Application No. PCT/US2023/029507, filed on Aug. 4, 2023, that claims priority to U.S. Provisional Patent Application No. 63/370,573 that was filed on Aug. 5, 2022, which is herein incorporated by reference in its entirety.

FIELD OF THE DISCLOSURE

Aspects of the disclosure relate to optical fibers and their use in hydrocarbon recovery operations as well as carbon capture and sequestration, and geothermal applications. More specifically, aspects of the disclosure relate to selection of optimal gauge length of fiber optic fibers for use in hydrocarbon recovery operations as well as carbon capture and sequestration, and geothermal applications.

BACKGROUND

Distributed vibration sensing (DVS), also known as distributed acoustic sensing (DAS), is an alternative method of recording vertical seismic profile (VSP) data using a fiber optic cable as the sensor rather than a series of discrete sensors deployed as a borehole seismic array. There have been several implementations of the technology, but they were all based on optical time-domain reflectometry (OTDR). An OTDR system operates by launching a pulse of light down a fiber optic cable. As the pulse travels down the cable, small fluctuations in the refractive index within the fiber, which are "frozen-in" during the manufacturing process, cause some of the light to be scattered. A small fraction of this light is scattered within the acceptance angle of the fiber and in the opposite direction to the laser, which then travels back up the fiber to be detected by a receiver. The position of the section of the fiber that contains the scatter source can be easily calculated from the recording time, speed of light, and the group refractive index of the glass.

When the fiber is at rest, the backscattered signal from multiple pulses, although random, is constant. However, when the cable is deformed, the travel time to sections of the fiber beyond the point of deformation changes, resulting in a change in the backscattered signal. The change in the amplitude of the backscattered signal has a highly nonlinear transfer function unsuited for seismic applications; thus, the phase difference between two points is used instead. The physical distance between the two points is what is referred to as the gauge length (GL), as illustrated in FIG. 1.

The gauge length is often mentioned as one of the most important parameters to select for a DAS acquisition, especially for certain DAS implementations where such parameter is defined in the hardware. Early references identified the importance of this parameter for signal-to-noise ratio (SNR) improvement, with typical values ranging between 7 m and 35 m. Additional work conducted in to study the relationship between the GL and the SNR showed that the SNR can be maximized by selecting a GL as a proportion of the apparent wavelength, with the recommended proportion being between 0.4 and 0.6.

However, most DAS systems can only work with a fixed GL (FGL) for the entire well depth whereas the apparent wavelength is likely to change with depth as a function of the geology of the subsurface, leading to two potential problems. Either the GL selected is too small for some receivers and a poor SNR is achieved or the GL is too high and the signal becomes distorted. In this paper, we first present a novel method to process the data using a variable gauge length (VGL). Second, we show the applications of this technique with synthetic DAS VSP data. Finally, we present examples of actual field datasets.

There is a need to provide an apparatus and methods that are easier to operate than conventional apparatus and methods for fiber optic systems.

There is a further need to provide apparatus and methods that do not have the drawbacks discussed above, namely laborious hand calculations to ensure correct results.

There is a still further need to reduce economic costs associated with operations and apparatus for fiber optic operations in relation to hydrocarbon recovery operations as well as carbon capture and sequestration and geothermal applications with conventional tools.

SUMMARY

So that the manner in which the above recited features of the present disclosure can be understood in detail, a more particular description of the disclosure, briefly summarized below, may be had by reference to embodiments, some of which are illustrated in the drawings. It is to be noted that the drawings illustrate only typical embodiments of this disclosure and are therefore not to be considered limiting of its scope, for the disclosure may admit to other equally effective embodiments without specific recitation. Accordingly, the following summary provides just a few aspects of the description and should not be used to limit the described embodiments to a single concept.

In one example embodiment, a method of processing data is disclosed. The method may comprise obtaining data from optical fibers and processing the data using a fixed gauge length and estimating an apparent velocity using the fixed gauge length through an autonomous computing arrangement. The method may also provide for estimating a source bandwidth from the apparent velocity through the autonomous computing arrangement to produce a result and establishing a variable gauge length and reference profile for the result. The method may also provide for processing the obtained optical data with the established variable gauge length to yield a processed optical data set.

In another example, a method for a well is disclosed, comprising deploying an optical fiber along well equipment and positioning the well equipment in a wellbore that penetrates a region of interest. The method may also comprise connecting the optical fiber into a distributed vibration sensing system and employing a length of the optical fiber to detect signals indicative of vibration in the region of interest. The method may further comprise selecting a wavelength of interest of the signals to be detected as a function of the length of the optical fiber to generate a variable gauge length profile to apply to phase data acquired from the detected signals, wherein the variable gauge length profile defines gauge length values that vary as a function of the optical fiber length. The method may also comprise using the variable gauge length profile to process the phase data acquired from the length of the optical fiber, wherein a gauge length value associated with a particular section of a plurality of sections of the optical fiber is used to process the phase data acquired from the particular section to thereby generate processed phase data, wherein the variable gauge length is calculated through an autonomous calculating system that uses an estimated apparent velocity and estimated bandwidth of the vibrations.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the drawings. It is to be noted, however, that the appended drawings illustrate only typical embodiments of this disclosure and are therefore not be considered limiting of its scope, for the disclosure may admit to other equally effective embodiments.

Figure 1:
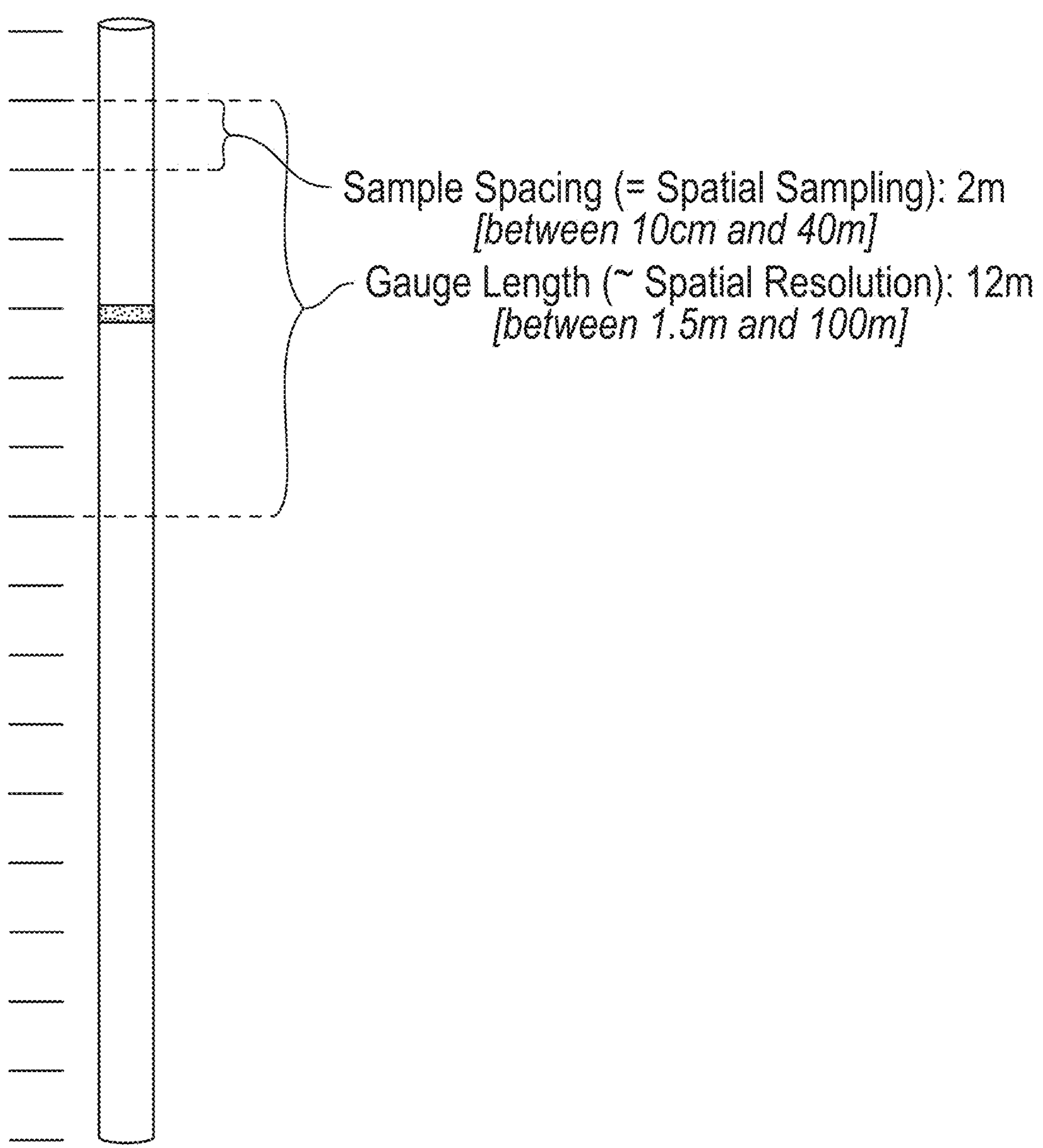
FIG. 1 is a cross-section of a defined gauge length.

To facilitate understanding, identical reference numerals have been used, where possible, to designate identical elements that are common to the figures ("FIGS"). It is contemplated that elements disclosed in one embodiment may be beneficially utilized on other embodiments without specific recitation.

DETAILED DESCRIPTION

In the following, reference is made to embodiments of the disclosure. It should be understood, however, that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the claims except where explicitly recited in a claim. Likewise, reference to "the disclosure" shall not be construed as a generalization of inventive subject matter disclosed herein and should not be considered to be an element or limitation of the claims except where explicitly recited in a claim.

Although the terms first, second, third, etc., may be used herein to describe various elements, components, regions, layers and/or sections, these elements, components, regions, layers and/or sections should not be limited by these terms. These terms may be only used to distinguish one element, components, region, layer or section from another region, layer or section. Terms such as "first", "second" and other numerical terms, when used herein, do not imply a sequence or order unless clearly indicated by the context. Thus, a first element, component, region, layer or section discussed herein could be termed a second element, component, region, layer or section without departing from the teachings of the example embodiments.

When an element or layer is referred to as being "on," "engaged to," "connected to," or "coupled to" another element or layer, it may be directly on, engaged, connected, coupled to the other element or layer, or interleaving elements or layers may be present. In contrast, when an element is referred to as being "directly on," "directly engaged to," "directly connected to," or "directly coupled to" another element or layer, there may be no interleaving elements or layers present. Other words used to describe the relationship between elements should be interpreted in a like fashion. As used herein, the term "and/or" includes any and all combinations of one or more of the associated listed terms.

Some embodiments will now be described with reference to the figures. Like elements in the various figures will be referenced with like numbers for consistency. In the following description, numerous details are set forth to provide an understanding of various embodiments and/or features. It will be understood, however, by those skilled in the art, that some embodiments may be practiced without many of these details, and that numerous variations or modifications from the described embodiments are possible. As used herein, the terms "above" and "below", "up" and "down", "upper" and "lower", "upwardly" and "downwardly", and other like terms indicating relative positions above or below a given point are used in this description to more clearly describe certain embodiments.

Figure 2:
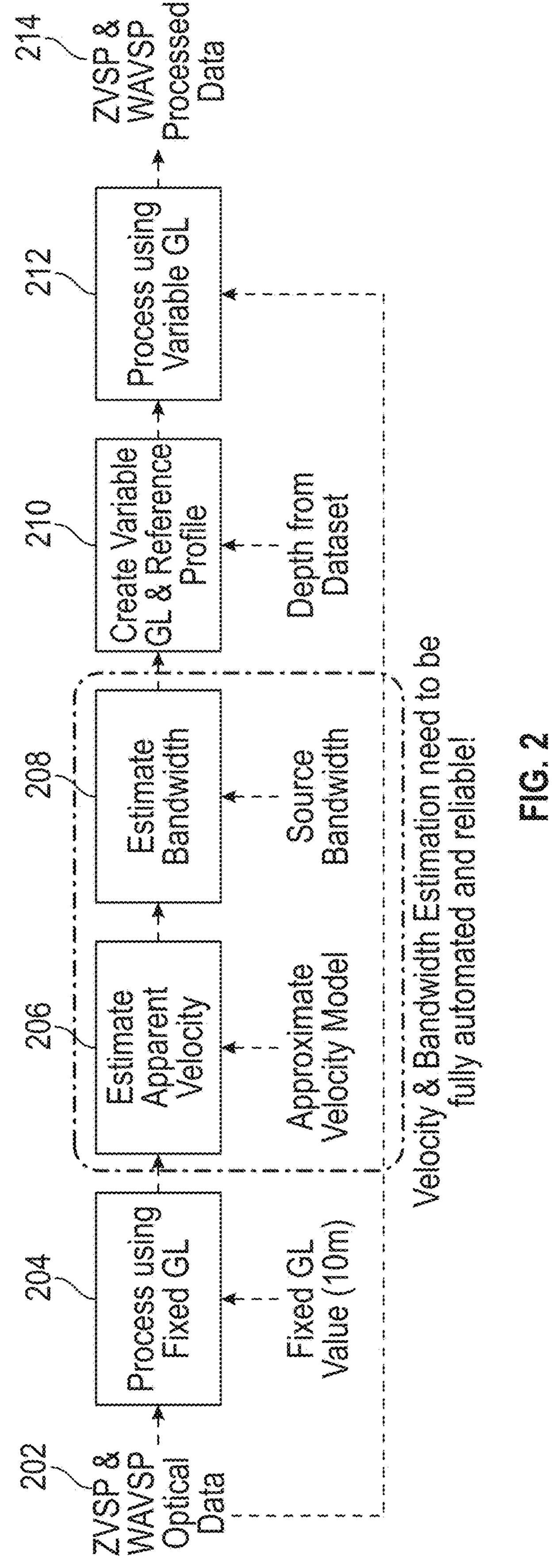
FIG. 2 is a flow chart of gauge length selection in one example embodiment of the disclosure.

Referring to FIG. 1, aspects of the disclosure include the removal of certain practical limitations via the use of automated algorithms for the estimation of the apparent velocity and bandwidth so that the local optimal GL can be calculated without any user intervention, and the VGL processing can be fully automated independently for each receiver and source location. An example of this is disclosed in FIG. 2. Referring to FIG. 2, a method 200 for processing data related to optical fibers is illustrated. At 202, ZVSP and WAVSP optical data is retained. At 204, the data from step 202 is processed using a fixed GL. The fixed GL may be, for example, 10 meters. As will be understood, other values may be chosen and the fixed GL may be varied. At 206, the processed data using the fixed GL is used to estimate an approximate velocity using a model. In embodiments, aspects of this disclosure provide for estimating the model using an autonomous calculating arrangement. In embodiments, the calculating arrangement may be a personal computer or may be a specifically designed unit to provide such calculations. In embodiments, the calculations may be further defined or performed through the use of artificial intelligence.

At 208, a bandwidth is estimated with the processed data from the results in 206. As with the processing in 206, the processing may be automated and without operator further operator interaction. At 210, a variable gauge length is established with the results from 208 as well as a reference profile corresponding to the variable gauge length. Using the reference profile from 210 and the selected variable gauge length, the optical data from 202 is processed at 212, resulting in a processed optical data at 214.

With the above method 200, in embodiments, the VGL profile would be automatically computed for each source position, allowing reprocessing of a WAVSP or even a 4D VSP with the guarantee to always maximize the SNR for each receiver and for each source location, instead of relying on the ZVSP profile as performed in conventional field data examples.

In embodiments, several processing methods may be used to accomplish this. In one non-limiting embodiment, visco-acoustic modeling may be used. Machine learning may also be used to automate the calculations of the optical gauge length.

In embodiments, the VGL concept for non-seismic applications of DAS interrogators may be used. For example, for pipeline integrity applications, one major issue is the increase of the noise level with distance as the optical losses become higher. One way to compensate for such losses, without the use of active/passive optical amplifications, is to define a VGL profile set to compensate for the optical losses, which would keep a flat noise profile with distance. In these embodiments, it would degrade the spatial resolution with distance, but this may be acceptable for certain applications such as intrusion detection where the ability to detect the intrusion is definitively improved with a lower noise level.

In some embodiments, for flow applications, benefits for calculations are derived from multiresolution measurement without having to reprocess the data. Such analysis may be performed when the data is split spatially. For instance, during hydraulic fracturing jobs, the main part of the wellbore could benefit from a longer GL to ensure a small noise level and increased ability to monitor microseismic events, whilst parts closer to the reservoir that are a target for fluid injection could benefit from a smaller GL to ensure an improved spatial resolution and better ability to confirm efficient fracturing for each specific interval.

In embodiments, a new method is used to determine optical gauge length with the help of variable gauge length processing, as described above, for different acquisition geometry. Such methods may be used in a variety of conditions, including temporarily deployed fiber, permanently deployed fiber, downhole deployed, surface deployed, jointly deployed space/time.

In embodiments, VGL (i) is used to improve SNR, (ii) to preserve signal, (iii) preserve amplitude (for example to extract Q).

In embodiments, the methods provided perform calculations automatically vs. user interaction-derived.

In embodiments, the method described may be used in a variety of application. In one example embodiment, the methods may be used in seismic application. In another example embodiment, the methods may be used in non-seismic applications, such as pipeline integrity evaluation and flow evaluation.

In embodiments, aspects of the disclosure provide an ability to update the VGL calculation formula as per the client requirements in terms of resolution loss, and HF/LF degradation.

In embodiments, aspects of the disclosure provide an ability to perform Q-Estimation without the need for amplitude compensation due to GL effects.

In embodiments, aspects of the disclosure provide an automatic calibration of the VGL profile from acquired VSP data using algorithms to measure the apparent velocity and bandwidth of the target arrival.

In embodiments, aspects of the disclosure provide algorithms that may be conventional signal processing algorithms, inversion from physical visco-acoustic modelling, or machine learning based algorithms.

In embodiments, aspects of the disclosure provide for multi-offset acquisitions, automatic identification of the limit when the current VGL profile is no-longer optimal and need to be re-calibrated, as an alternative to always calibrating the VGL for each source position.

In embodiments, aspects of the disclosure provide a use of VGL processing for pipeline integrity monitoring, where the VGL allows to mitigate the optical losses vs. length and maintain a constant detection ratio along the entire fiber, whilst keeping the spatial resolution under a tolerated maximum to allow intervention.

In embodiments, aspects of the disclosure provide a use of VGL processing for flow applications to target the spatial resolution of the measurement to the applications, for example larger resolution microseismic which requires lower noise, and smaller resolution for cluster allocations which requires to distinguish between close by intervals.

Aspects of the disclosure provide an apparatus and methods that are easier to operate than conventional apparatus and methods for fiber optic systems.

Aspects of the disclosure provide apparatus and methods that do not have the drawbacks discussed above, namely laborious hand calculations to ensure correct results.

Aspects of the disclosure reduce economic costs associated with operations and apparatus for fiber optic operations in relation to hydrocarbon recovery operations as well as carbon capture and sequestration, and geothermal applications with conventional tools.

In one example embodiment, a method of processing data is disclosed. The method may comprise obtaining data from optical fibers and processing the data using a fixed gauge length and estimating an apparent velocity using the fixed gauge length through an autonomous computing arrangement. The method may also provide for estimating a source bandwidth from the apparent velocity through the autonomous computing arrangement to produce a result and establishing a variable gauge length and reference profile for the result. The method may also provide for processing the obtained optical data with the established variable gauge length to yield a processed optical data set.

In another example embodiment of the disclosure the method of processing data may be performed wherein the data is obtained from in-situ optical fibers in a hydrocarbon recovery project.

In another example embodiment of the disclosure the method of processing data may be performed wherein the data is obtained from in-situ optical fibers in a carbon capture and sequestration project.

In another example embodiment of the disclosure, the method of processing data may be performed wherein the obtained optical data is at least one of ZVSP and WAVSP data.

In another example embodiment of the disclosure, the method of processing data may be performed wherein the fixed gauge length is 10 meters.

In another example embodiment of the disclosure the method of processing data may be performed wherein the autonomous calculating arrangement is a personal computer.

In another example embodiment of the disclosure the method of processing data may be performed wherein the autonomous calculating arrangement is equipped with one of a machine learning program and an artificial intelligence program.

In another example embodiment of the disclosure the method of processing data may be performed wherein the fixed gauge length is predetermined by an operator.

In another example embodiment of the disclosure the method of processing data may be performed wherein the optical fibers are one of temporarily deployed fibers, permanently deployed fibers, downhole deployed optical fibers, surface deployed optical fibers and jointly deployed in space/time optical fibers.

In another example embodiment of the disclosure the method of processing data may be performed wherein the method is performed during a hydraulic fracturing project and the fixed gauge length is greater than 10 meters to ensure a small developed noise level.

In another example embodiment of the disclosure the method of processing data may be performed wherein the method is performed during a hydraulic fracturing project and the fixed gauge length is less than 10 meters for a target near a reservoir.

In another example embodiment of the disclosure the method of processing data may further comprise determining a resolution loss for the processed optical data set and obtaining a desired resolution loss; and comparing the determined resolution loss to the desired resolution loss.

In another example embodiment of the disclosure the method of processing data may be performed wherein when the comparing the determined resolution loss to the desired resolution loss indicates a resolution loss greater than desired, then performing the method a second time.

In another example embodiment of the disclosure the method of processing data may further comprise determining a high frequency loss for the processed optical data set, obtaining a desired high frequency loss and comparing the high frequency loss to the desired high frequency loss.

In another example embodiment of the disclosure the method of processing data may be performed wherein when the comparing the determined high frequency loss to the desired high frequency loss indicates a high frequency loss greater than desired, then performing the method a second time.

In another example embodiment of the disclosure the method of processing data may further comprise determining a low frequency loss for the processed optical data set, obtaining a desired low frequency loss and comparing the low frequency loss to the desired low frequency loss.

In another example embodiment of the disclosure the method of processing data may be performed wherein when the comparing the determined low frequency loss to the desired low frequency loss indicates a low frequency loss greater than desired, then performing the method a second time.

In another example, a method for a well is disclosed, comprising deploying an optical fiber along well equipment and positioning the well equipment in a wellbore that penetrates a region of interest. The method may also comprise connecting the optical fiber into a distributed vibration sensing system and employing a length of the optical fiber to detect signals indicative of vibration in the region of interest. The method may further comprise selecting a wavelength of interest of the signals to be detected as a function of the length of the optical fiber to generate a variable gauge length profile to apply to phase data acquired from the detected signals, wherein the variable gauge length profile defines gauge length values that vary as a function of the optical fiber length. The method may also comprise using the variable gauge length profile to process the phase data acquired from the length of the optical fiber, wherein a gauge length value associated with a particular section of a plurality of sections of the optical fiber is used to process the phase data acquired from the particular section to thereby generate processed phase data, wherein the variable gauge length is calculated through an autonomous calculating system that uses an estimated apparent velocity and estimated bandwidth of the vibrations.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may be varied in many ways. Such variations are not to be regarded as a departure from the disclosure, and all such modifications are intended to be included within the scope of the disclosure.

While embodiments have been described herein, those skilled in the art, having benefit of this disclosure, will appreciate that other embodiments are envisioned that do not depart from the inventive scope. Accordingly, the scope of the present claims or any subsequent claims shall not be unduly limited by the description of the embodiments described herein.

What is claimed is:

1. A method of operating in a wellbore, comprising:
- deploying optical fibers in the wellbore;
- positioning well equipment in the wellbore;
- performing wellbore operations with the well equipment in the wellbore;
- analyzing the wellbore operations, comprising:
  - obtaining data from the optical fibers;
  - processing the data using a fixed gauge length;
  - estimating an apparent velocity using the fixed gauge length through an autonomous computing arrangement;
  - estimating a source bandwidth from the apparent velocity through the autonomous computing arrangement to produce a result;
  - establishing a variable gauge length and reference profile for the result;
  - processing the obtained data with the established variable gauge length to yield a processed optical data set;
  - determining a high frequency loss for the processed optical data set;
  - obtaining a desired high frequency loss; and
  - comparing the high frequency loss to the desired high frequency loss; and
- confirming efficient wellbore operations in the wellbore in response to analyzing the wellbore operations.

2. The method according to claim 1, wherein the data is obtained from in-situ optical fibers in a hydrocarbon recovery project.

3. The method according to claim 1, wherein the data is obtained from in-situ optical fibers in a carbon capture and sequestration project.

4. The method according to claim 1, wherein the obtained optical data is at least one of ZVSP data and WAVSP data.

5. The method according to claim 1, wherein the fixed gauge length is 10 meters.

6. The method according to claim 1, wherein the autonomous computing arrangement is a personal computer.

7. The method according to claim 1, wherein the autonomous computing arrangement is equipped with one of a machine learning program and an artificial intelligence program.

8. The method according to claim 1, wherein the fixed gauge length is predetermined by an operator.

9. The method according to claim 1, wherein the optical fibers are one of temporarily deployed fibers, permanently deployed fibers, downhole deployed optical fibers, surface deployed optical fibers, and jointly deployed in space/time optical fibers.

10. The method according to claim 1, wherein the method is performed during a hydraulic fracturing project and the fixed gauge length is greater than 10 meters to ensure a small developed noise level.

11. The method according to claim 1, wherein the method is performed during a hydraulic fracturing project and the fixed gauge length is less than 10 meters for a target near a reservoir.

12. The method according to claim 1, wherein when the comparing the determined high frequency loss to the desired high frequency loss indicates a high frequency loss greater than a desired loss, then performing analyzing the wellbore operations a second time to decrease the high frequency loss toward the desired loss.

13. The method according to claim 1, wherein establishing the variable gauge length and the reference profile comprises establishing the variable gauge length and the reference profile tailored to a plurality of measurement applications, wherein a noise level and a spatial resolution varies between the plurality of measurement applications, wherein the noise level is inversely proportional to the spatial resolution, such that an increase in the noise level is associated with an improvement in the spatial resolution, and a decrease in the noise level is associated with a degradation in the spatial resolution.

14. The method according to claim 1, wherein establishing the variable gauge length and the reference profile comprises decreasing the variable gauge length with distance in a downhole direction in the wellbore to achieve:

a first gauge length at a first position in the downhole direction in the wellbore, wherein the first gauge length results in a first noise level and a first spatial resolution, and the first gauge length is increased to reduce the first noise level and degrade the first spatial resolution; and a second gauge length at a second position in the downhole direction in the wellbore, wherein the second gauge length results in a second noise level and a second spatial resolution, the second gauge length is decreased to increase the second noise level and improve the second spatial resolution, and the first position and the second position are offset from one another in the downhole direction.

15. The method according to claim 14, wherein the second position is further in the downhole direction relative to the first position, and the first gauge length is greater than the second gauge length.

16. The method according to claim 15, wherein the first gauge length is increased to reduce the first noise level to improve measurements of microseismic events, and the second gauge length is decreased to improve the second spatial resolution to confirm efficient fracturing.

17. The method according to claim 1, wherein establishing the variable gauge length and the reference profile comprises decreasing the variable gauge length with distance in a downhole direction in the wellbore to achieve a flat noise profile over the distance in the downhole direction in the wellbore.

18. A method of operating in a wellbore, comprising:

deploying optical fibers in the wellbore;

positioning well equipment in the wellbore;

performing wellbore operations with the well equipment in the wellbore;

analyzing the wellbore operations, comprising:

obtaining data from optical fibers;

processing the data using a fixed gauge length;

estimating an apparent velocity using the fixed gauge length through an autonomous computing arrangement;

estimating a source bandwidth from the apparent velocity through the autonomous computing arrangement to produce a result;

establishing a variable gauge length and reference profile for the result;

processing the obtained data with the established variable gauge length to yield a processed optical data set;

determining a low frequency loss for the processed optical data set;

obtaining a desired low frequency loss; and comparing the low frequency loss to the desired low frequency loss; and confirming efficient wellbore operations in the wellbore in response to analyzing the wellbore operations.

19. The method according to claim 18, wherein when the comparing the determined low frequency loss to the desired low frequency loss indicates a low frequency loss greater than a desired loss, then performing analyzing the wellbore operations a second time to decrease the low frequency loss toward the desired loss.

20. The method according to claim 1, wherein the data is obtained from optical fibers in communication with a pipeline.

* * * * *